United States Patent
Maki

(10) Patent No.: US 8,473,138 B2
(45) Date of Patent: Jun. 25, 2013

(54) DRIVING CONTROL DEVICE

(75) Inventor: Kentaro Maki, Ushiku (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 13/391,846

(22) PCT Filed: Aug. 11, 2010

(86) PCT No.: PCT/JP2010/063650
§ 371 (c)(1),
(2), (4) Date: Apr. 11, 2012

(87) PCT Pub. No.: WO2011/033889
PCT Pub. Date: Mar. 24, 2011

(65) Prior Publication Data
US 2012/0191282 A1    Jul. 26, 2012

(30) Foreign Application Priority Data

Sep. 15, 2009    (JP) .................................. 2009-212627

(51) Int. Cl.
*B60L 9/00*    (2006.01)
(52) U.S. Cl.
USPC .......................................................... 701/22
(58) Field of Classification Search
None
See application file for complete search history.

(56) References Cited

U.S. PATENT DOCUMENTS

| | | | |
|---|---|---|---|
| 6,528,959 B2 * | 3/2003 | Kitano et al. | 318/55 |
| 6,925,371 B2 * | 8/2005 | Yasui et al. | 701/72 |
| 2002/0041167 A1 * | 4/2002 | Kitano et al. | 318/3 |
| 2005/0150702 A1 | 7/2005 | Matsuzaki | |

FOREIGN PATENT DOCUMENTS

| | | |
|---|---|---|
| JP | 9-284911 A | 10/1997 |
| JP | 11-208304 A | 8/1999 |
| JP | 2002-46507 A | 2/2002 |
| JP | 2005-186756 A | 7/2005 |
| JP | 2006-160104 A | 6/2006 |

OTHER PUBLICATIONS

GP Planning Center, "Latest 4WD Mechanism", Grand Pix Book Publishing, 2003, Chapter 6-2, pp. 208-215 (p. 12 is partially translated).
International Search Report including English language translation dated Nov. 2, 2010 (Seven (7) pages).

* cited by examiner

*Primary Examiner* — Thomas Tarcza
*Assistant Examiner* — Adam Alharbi
(74) *Attorney, Agent, or Firm* — Crowell & Moring LLP

(57) ABSTRACT

A driving control device for a vehicle in which one of a front-wheel side and a rear-wheel side is driven by an engine and an other of them is driven by a motor, reduces a driving force by the motor to recover a grip and estimates a road friction coefficient. The driving control device further transmits an engine driving force to drive wheels, and temporary increases the motor driving force in accordance with the engine driving force and the motor drive wheel grip limit line according to an estimated road friction coefficient.

5 Claims, 15 Drawing Sheets

DRIVING CONTROL DEVICE

TECHNICAL FIELD

The present invention relates to a driving control device, in particular, a control device for a four-wheel drive hybrid vehicle.

BACKGROUND ART

In view of the global environment, development of hybrid vehicles that include an engine and a motor as a driving force source has been being promoted. Hybrid vehicles take advantage of motor travel in a low-efficiency operating range of the engine, recovery of braking energy, which was conventionally given up as heat, and the like, and thus realize low fuel consumption and have an effect on reduction in greenhouse gas.

There is a structure of a four-wheel drive hybrid vehicle in which either front wheels or rear wheels are driven by an engine and the other wheels are driven by a motor. In a vehicle with such structure, during two-wheel drive travel only with the engine or only with the motor, when slip of the drive wheel is caused by, for instance, entering a road with a friction coefficient that is sufficiently small for the wheel to slip, i.e., a low μ road, the vehicle is controlled in general so that the non-drive wheels are driven by the other driving force source in order to travel in four-wheel drive mode for recovery of vehicle driving force (NON-PATENT LITERATURE 1).

When the drive wheel slips during two-wheel drive by the engine, the non-drive wheels are driven by the motor so as to perform four-wheel drive. Since the motor in general has an excellent responsiveness to a required driving force, vehicle driving force recovery can be performed rapidly. When the drive wheel slips during two-wheel drive by the motor, on the other hand, the other wheels are driven by the engine so as to perform four-wheel drive. Since the engine needs time for its start up, a clutch engagement operation, and torque rise, there is a problem that delay occurs before the desired engine torque is transmitted to the drive shaft and thus vehicle driving force recovery can not be performed rapidly. Since delay in vehicle driving force recovery may not just cause poor operability but also cause backward movement of the vehicle during uphill traveling, it is desirable to rapidly recover the vehicle driving force.

To address this problem, Japanese Laid Open Patent Publication No. 2006-160104 presents a rapid vehicle driving force recovery performed by providing the vehicle with a motor also on the side driven by the engine. In addition, Japanese Laid Open Patent Publication No. 2005-186756 presents a method to recover from a slip state, without using engine output, by repeating increase and decrease of motor torque when the motor driving wheel slips.

CITATION LIST

Patent Literature

[PATENT LITERATURE 1] Japanese Laid Open Patent Publication No. 2006-160104
[PATENT LITERATURE 2] Japanese Laid Open Patent Publication No. 2005-186756

Non-Patent Literature

[NON-PATENT LITERATURE 1] GP Planning Center, "Latest 4WD Mechanism" Grand Prix Book Publishing, 2003

SUMMARY OF INVENTION

Technical Problem

The present invention intends to perform vehicle driving force recovery more rapidly when a motor driving wheel slips.

Solution to Problem

A driving control device for a vehicle in which one of a front-wheel side and a rear-wheel side is driven by an engine and an other of them is driven by a motor, according to a first aspect of the present invention, the driving control device comprises: a first driving force detection circuit unit that detects reduction of vehicle driving force due to a change of road friction coefficient in a state where driving force by the engine is not transmitted; a first motor control circuit unit that reduces driving force by the motor in response to a detection result of the first driving force detection circuit unit; a second driving force detection circuit unit that detects recovery of the vehicle driving force due to reduction of motor driving force by the first motor control circuit unit; a friction coefficient estimation circuit unit that estimates a road friction coefficient based upon a detection result of the second driving force detection circuit unit; a target driving force distribution setting circuit unit that sets a target driving force distribution based upon a detection result of the second driving force detection circuit unit and an estimation result of the friction coefficient estimation circuit unit; an engine control circuit unit that increases transmitted driving force by the engine in response to a detection result of the second driving force detection circuit unit; and a second motor control circuit unit that increases the motor driving force that has been reduced by the first motor control circuit unit in accordance with increase of transmitted driving force by the engine.

According to a second aspect of the present invention, in the driving control device according to the first aspect, it is preferable that the friction coefficient estimation circuit unit estimates the road friction coefficient based upon the motor driving force of a timing when recovery of the vehicle driving force is detected by the second driving force detection circuit unit.

According to a third aspect of the present invention, in the driving control device according to the first aspect, it is preferable that the target driving force distribution setting circuit unit sets the target driving force distribution based upon the motor driving force of a timing when recovery of the vehicle driving force is detected by the second driving force detection circuit unit, a rear-wheel grip limit in the road friction coefficient estimated by the friction coefficient estimation circuit unit, and a driving force before reduction of the driving force has been detected by the first driving force detection circuit unit.

According to a fourth aspect of the present invention, in the driving control device according to the first aspect, the target driving force distribution setting circuit unit may set the target driving force distribution based upon the motor driving force of a timing when recovery of the vehicle driving force is detected by the second driving force detection circuit unit, rear-wheel grip limit in a road friction coefficient that is smaller by a predetermined amount than the road friction coefficient estimated by the friction coefficient estimation circuit unit, and driving force before reduction in the driving force has been detected by the first driving force detection circuit unit.

According to a fifth aspect of the present invention, in the driving control device according to the first aspect, the second motor control circuit unit may increase or maintain the motor driving force until sum of the driving force by the motor and the driving force by the engine reaches driving force before reduction in the driving force has been detected by the first driving force detection circuit unit, based upon an estimation result of the friction coefficient estimation circuit unit and a setting result of the target driving force distribution setting circuit unit.

According to a sixth aspect of the present invention, in the driving control device according to the first aspect, it is preferable that the second motor control circuit unit increases or maintains the motor driving force until a proportion of the driving force by the motor and the driving force by the engine reaches a predetermined ideal front and rear driving force distribution based upon an estimation result of the friction coefficient estimation circuit unit and a setting result of the target driving force distribution setting circuit unit.

A driving control device for a vehicle in which one of a front-wheel side and a rear-wheel side is driven by both an engine and an engine-side motor or by the engine-side motor and an other of them is driven by a motor, according to a seventh aspect of the present invention, the driving control device comprises: a first driving force detection circuit unit that detects reduction of vehicle driving force due to a change of a road friction coefficient in a state where driving force by the engine is not transmitted; a four-wheel motor travel possible/impossible determination circuit unit that makes a decision as to whether or not four-wheel motor travel by the engine-side motor and the motor is possible; and a slip control mode switching circuit unit that switches between a slip control mode using the engine and a slip control mode without using the engine in accordance with a determination result of the four-wheel motor travel possible/impossible determination circuit unit.

According to an eighth aspect of the present invention, in the driving control device according to the seventh aspect, it is preferable to further comprise: a first motor control circuit unit that reduces driving force by the motor in response to a detection result of the first driving force detection circuit unit; a second driving force detection circuit unit that detects recovery of the vehicle driving force due to reduction of motor driving force by the first motor control circuit unit; a friction coefficient estimation circuit unit that estimates a road friction coefficient based upon a detection result of the second driving force detection circuit unit; a target driving force distribution setting circuit unit that sets a target driving force distribution based upon a detection result of the second driving force detection circuit unit and an estimation result of the friction coefficient estimation circuit unit; an engine control circuit unit that increases transmitted driving force by the engine in response to a detection result of the second driving force detection circuit unit; and a second motor control circuit unit that increases the driving force of the motor that has been reduced by the first motor control circuit unit in accordance with increase of transmitted driving force by the engine, wherein: the slip control mode using the engine to be switched and selected by the slip control mode switch circuit unit is a mode in which a driving force recovery control is carried out using the first motor control circuit unit, the second driving force detection circuit unit, the friction coefficient estimation circuit unit, the target driving force distribution setting circuit unit, the engine control circuit unit, and the second motor control circuit unit.

According to a ninth aspect of the present invention, in the driving control device according to the seventh aspect, it is preferable to further comprise: a first motor control circuit unit that reduces driving force by the motor in response to a detection result of the first driving force detection circuit unit; a second driving force detection circuit unit that detects recovery of the vehicle driving force due to reduction of motor driving force by the first motor control circuit unit; a friction coefficient estimation circuit unit that estimates a road friction coefficient based upon a detection result of the second driving force detection circuit unit; and a third motor control circuit unit that controls driving forces of the engine-side motor and the motor so as to satisfy driving force before reduction in the driving force has been detected by the first driving force detection circuit unit and to realize predetermined ideal front and rear distribution in accordance with a detection result of the second driving force detection circuit unit and an estimation result of the friction coefficient estimation circuit unit, wherein: a slip control mode without using the engine to be switched and selected by the slip control mode switch circuit unit is a mode in which a driving force recovery control is carried out using the first motor control circuit unit, the second driving force detection circuit unit, the friction coefficient estimation circuit unit, and the third motor control circuit unit.

According to a tenth aspect of the present invention, in the driving control device according to the seventh aspect, the four-wheel motor travel possible/impossible determination circuit unit may make a decision as to whether or not the four-wheel motor travel is possible based upon a remaining level of a battery that supplies electric power to the engine-side motor, a presence or absence of abnormality of the engine-side motor, and a presence or absence of abnormality of an inverter that controls the electric power to be supplied to the engine-side motor.

Advantageous Effect of the Invention

According to the present invention, when a motor drive wheel slips, the vehicle driving force is recovered rapidly and stable traveling is ensured.

DESCRIPTION OF EMBODIMENTS

An embodiment of the driving control device for a four-wheel drive hybrid vehicle of the present invention will now be explained with reference to the drawings. While in the present embodiment, a structure in which front wheels are driven by an engine and rear wheels are driven by a motor is adopted for the sake of convenience of explanation, the same control can be applied in practice even if the front and rear driving force sources are switched.

First Embodiment

Figure 1:
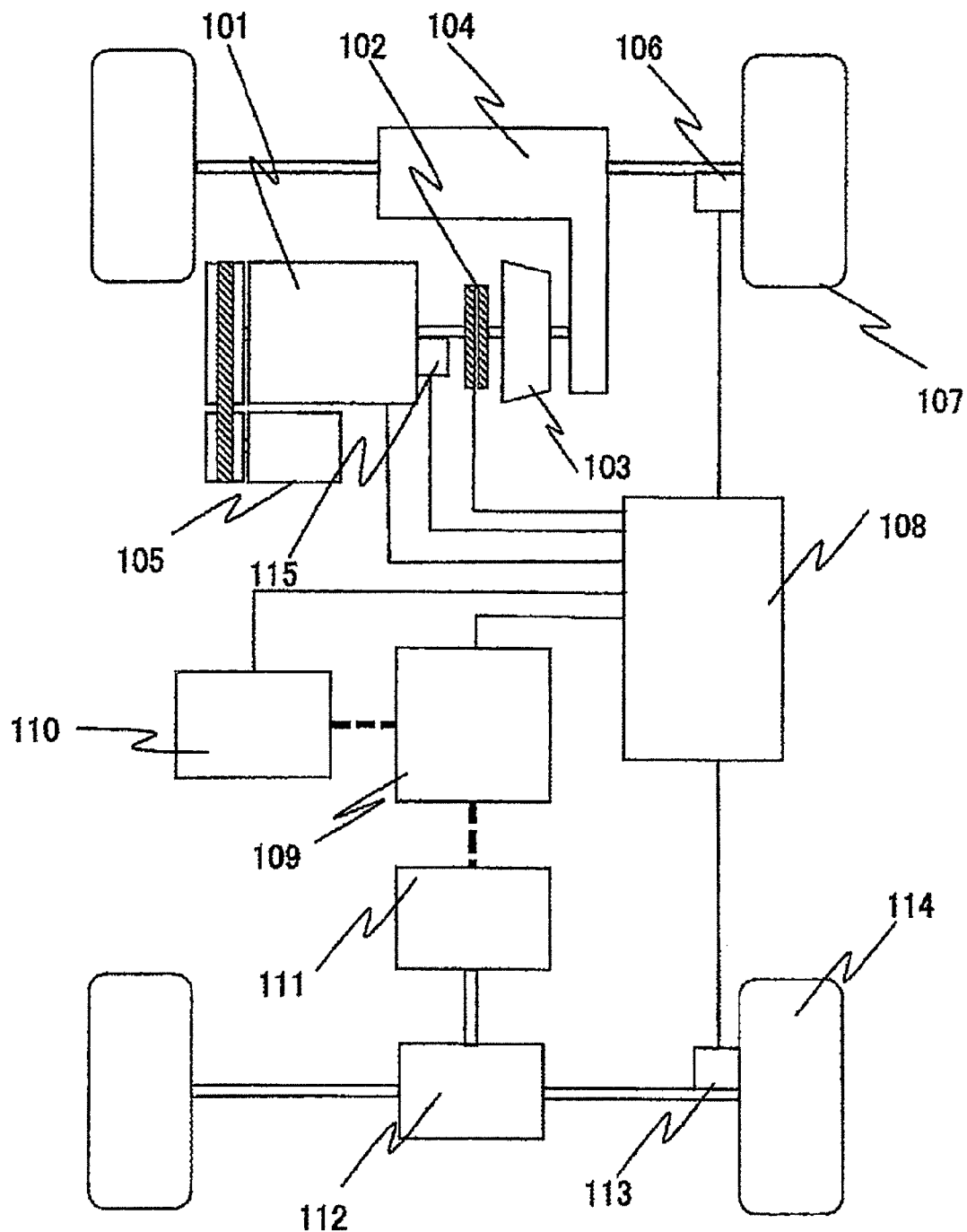
FIG. 1 is a hardware structure diagram of a hybrid vehicle driving control device in a first embodiment.

The structure of the four-wheel drive hybrid vehicle with which the present embodiment is intended to be used will be explained with reference to FIG. 1. Driving force by an engine 101 is transmitted to front wheels 107 through a clutch 102, a transmission 103, and a front differential gear 104. The engine 101 is started with a starter 105, and, by gradually engaging the clutch 102 from a released state, torque of the engine 101 is transmitted to the transmission 103 and devices following the transmission. A motor 111, which is a rear-wheel-side driving force source, generates torque using electric power of a battery 110 controlled by an inverter 109. Torque of the motor 111 is transmitted to rear wheels 114 through a rear differential gear 112. An ECU 108 can obtain wheel speeds of the front and rear wheels from a front-wheel rotational speed detection means 106 and a rear-wheel rotational speed detection means 113, the engine speed and estimated engine torque from an engine state detection means 115, and information on a battery state of charge SOC from the battery 110, and, based upon those, determines engine output and motor output, and sends instructions to the engine 101, the clutch 102, and the inverter 109.

More specifically, the ECU 108 includes a first driving force detection circuit unit that detects reduction in vehicle driving force caused by a change in the road friction coefficient in a state where driving force by the engine 101 is not transmitted, a first motor control circuit unit that controls driving force by the motor 111 to be reduced in accordance with a detection result of the first driving force detection circuit unit, a second driving force detection circuit unit that detects vehicle driving force recovery caused by reduction in motor driving force by the first motor control circuit unit, a friction coefficient estimation circuit unit that estimates the road friction coefficient based upon a detection result of the second driving force detection circuit unit, a target driving force distribution setting circuit unit that sets target driving force distribution based upon the detection result of the second driving force detection circuit unit and the estimation result of the friction coefficient estimation circuit unit, an engine control circuit unit that controls transmission driving force (transmitted driving force) by the engine 101 to be increased in accordance with the detection result of the second driving force detection circuit unit, and a second motor control circuit unit that controls driving force of the motor that has been reduced by the first motor control circuit unit to be increased in accordance with rise of transmission driving force by the engine 101.

Figure 2:
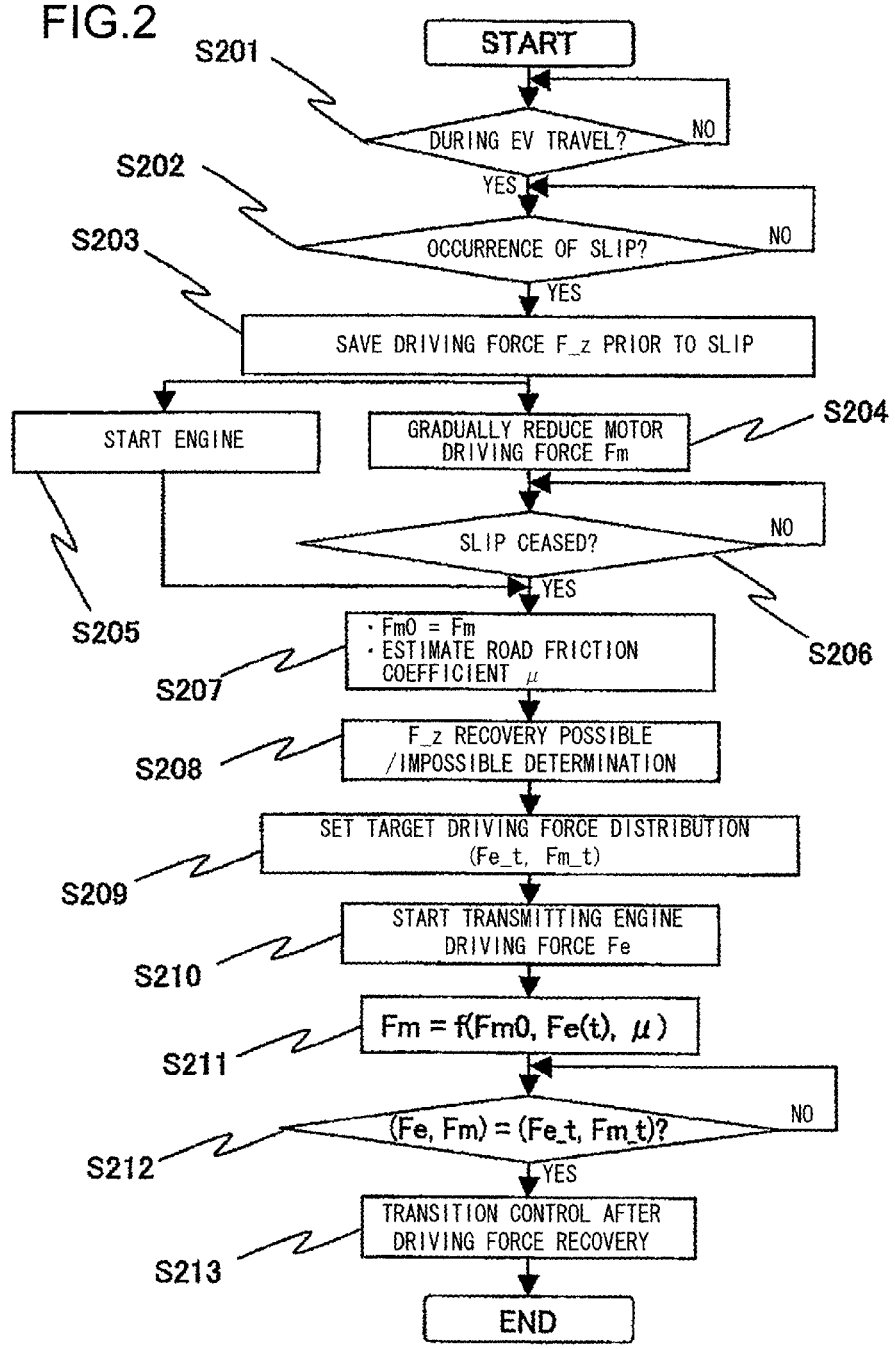
FIG. 2 is a flow chart of the overall control in the first embodiment.

The whole picture of control of the present embodiment will be explained with reference to FIG. 2. FIG. 2 is a flow chart showing the processing procedure of driving force recovery control processing executed at the ECU 108.

In step 201, a decision is made as to whether or not the present hybrid vehicle is performing two-wheel drive travel by the motor (hereinafter referred to as "EV travel"). During the EV travel, if occurrence of slip in the motor driving wheel is detected in step 202, the flow of control proceeds to step 203. In the detection of occurrence of slip in step 202, a decision is made that slip of the rear wheel 114 is occurring if a decision is made that the wheel speed of the rear wheels 114 is greater than the wheel speed of the front wheels 107 by a difference equal to or greater than a certain threshold value based on the wheel speeds of the front and rear wheels detected by the front-wheel rotational speed detection means 106 and the rear-wheel rotational speed detection means 113.

In step 203, vehicle driving force immediately prior to the slip detection is saved in a memory in the ECU 108 as F_z. F_z is calculated from a motor current amount Im_z and a motor rotational speed Nm_z immediately prior to the slip detection, a reduction ratio FinalGearRear in the rear differential gear 112, and a tire radius Rtire. More specifically, a motor torque Tm_z is obtained by expression (1) and F_z is calculated by multiplying the motor torque Tm_z by the reduction ratio and the tire radius as in expression (2). The function f(Im_z, Nm_z) of the expression (1) can be not only obtained by calculating a theoretical expression but also substituted by using a two-dimensional map prepared on the memory where the current Im_z and the rotational speed Nm_z are used as input and the torque Tm_z is used as output.

$$Tm\_z = f(Im\_z, Nm\_z) \tag{1}$$

$$F\_z = Tm\_z \times \text{FinalGearRear} \times R\text{tire} \tag{2}$$

Following that, in order to recover the grip of the rear wheels 114, output of the motor 111 is gradually reduced at a predetermined rate (step 204). At the same time, the starter 105 is caused to start the engine 101, so that it is kept in an idling state (step 205). The reduction in motor driving force in step 204 continues until the slip of the rear wheel 114 ceases. A decision is made that the rear-wheel slip has ceased if the wheel speed difference in the front and rear wheels detected by the front-wheel rotational speed detection means 106 and the rear-wheel rotational speed detection means 113 becomes equal to or less than a predetermined value. Upon making a decision in step 206 that the slip of the rear wheel 114 has ceased, in step 207, the motor driving force when the slip ceased is saved as Fm0 into the memory in the ECU 108. Here, the motor driving force Fm0 is a value obtained by converting motor torque into vehicle driving force similarly to the expression (2). In addition, in step 207, estimation of a road friction coefficient μ is performed. Estimation of the road friction coefficient μ will be described later.

In step 208, on an assumption of the road friction coefficient μ estimated in step 207, a decision is made as to whether or not the driving force F_z prior to slip can be recovered by driving force distribution in a range where no slip occurs. The method for F_z recovery possible/impossible determination will be described later.

In step 209, a target driving force distribution (Fe_t, Fm_t) is set based upon the determination result in step 208. Here, Fe_t is a vehicle driving force by the engine 101 and Fm_t is a vehicle driving force by the motor 111. The setting method for the target driving force distribution will be described later.

Next, in step 210, the driving force of the engine 101 starts to be transmitted to the front wheels 107. Since the engine 101 has been started in step 205 and is in the idling state, engagement of the clutch 102 and increase in engine torque are performed in step 210 by an instruction from the ECU 108. As described earlier, delay is apt to occur before the vehicle driving force by the engine becomes the desired value, requiring a length of time of a few hundred milliseconds.

In the next step 211, the ECU 108 calculates a motor driving force Fm to be output using the motor driving force Fm0 when the slip ceases, a time-changing engine driving force Fe(t), and the road friction coefficient μ estimated in step 207 as input. The calculation method for the motor driving force Fm in step 211 will be described later.

The output of the motor driving force in step 211 continues until the engine driving force Fe and the motor driving force Fm reach the target driving force distribution, that is, $$Fe=Fe\_t, Fm=Fm\_t \quad (3)$$

(step 212). It is not until the expression (3) is satisfied that, while slip is prevented, the vehicle driving force prior to slip is recovered or the maximum vehicle driving force that enables stable traveling is recovered. After that, an appropriate transition control after driving force recovery is performed in accordance with a road condition and a vehicle condition (step 213). The transition control after driving force recovery of step 213 will be described later.

The above is the whole picture of the control of the present embodiment. The contents of the control will now be explained in detail.

Prior to detailed explanation of the control contents, the driving force distribution diagram shown in FIG. 3 and FIG. 5 will be explained. The driving force distribution diagram has a horizontal axis that represents the front-wheel driving force and a vertical axis that represents the rear-wheel driving force. In the present embodiment, the horizontal axis corresponds to the driving force by the engine and the vertical axis corresponds to the driving force by the motor. The downward convex curve is referred to as an ideal driving force distribution line, which represents an ideal driving force distribution in which frictional force of tires can be fully exerted to drive both the front and rear wheels in a four-wheel drive vehicle. The downward convex shape of the ideal driving force distribution line means that as the driving force is great, the ground contact load distribution of the front and rear wheels is biased to the rear-wheel side and the driving force that can be exerted (the product of the friction coefficient and the vertical load of the tires) becomes great on the rear-wheel side.

Next, the grip limit line will be explained. The grip limit line differs depending upon the road friction coefficient and is expressed by a line segment for each of the front and rear wheels. FIG. 3 presents two types of the grip limit lines (μ1>μ2) with respect to the road friction coefficients μ1 and μ2. For each of the road friction coefficients, a region bounded by two grip limit lines for the front and rear wheels and both of the vertical and horizontal axes is a stable driving force distribution region in which tire slip does not occur. The larger the road friction coefficient is, the wider the stable driving force distribution region is. In the region of rear-wheel-biased driving force distribution beyond the rear-wheel grip limit line across the stable driving force distribution region, the rear wheel slips, and, in the region of front-wheel-biased driving force distribution beyond the front-wheel grip limit line across the stable driving force distribution region, the front wheel slips. In addition, the downward-sloping dotted line represents an equal driving force line, and, as long as on the equal driving force line, the driving force to be output for the vehicle in total remains the same unless the wheel slips.

The above is the explanation of the driving force distribution diagram. Following that, the control contents will be explained in detail. FIG. 3 and FIG. 4 present a case with relatively large road friction coefficients at the time of slipping and FIG. 5 and FIG. 6 present a case with small road friction coefficients (μ2>μ3). The former corresponds to the case where the F_z recovery in step 208 is possible and the latter corresponds to the case where the F_z recovery is impossible.

Figure 3:
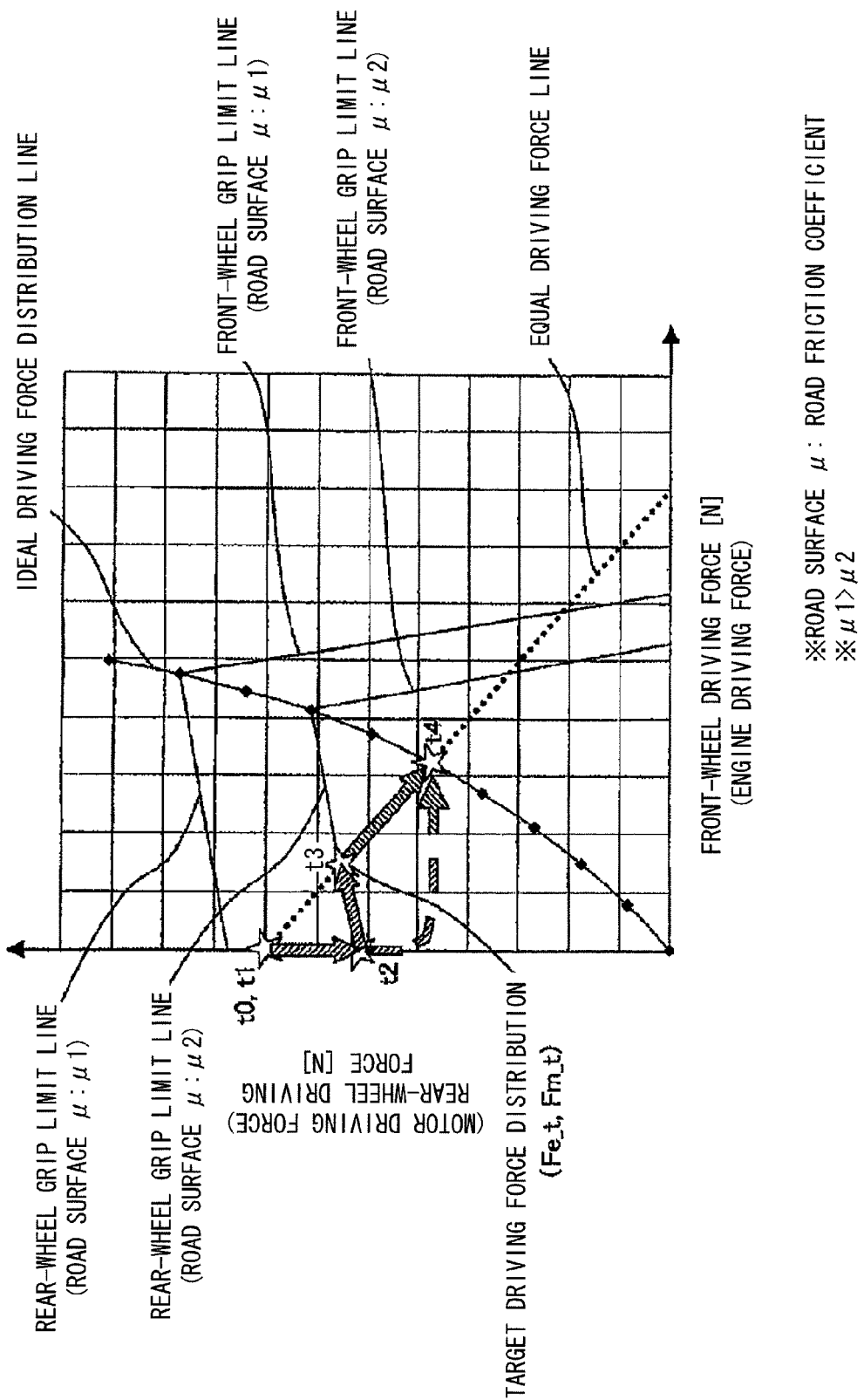
FIG. 3 is a driving force distribution diagram (in a case where driving force before slipping can be recovered) showing the driving force distribution control process in the first embodiment.
Figure 4:
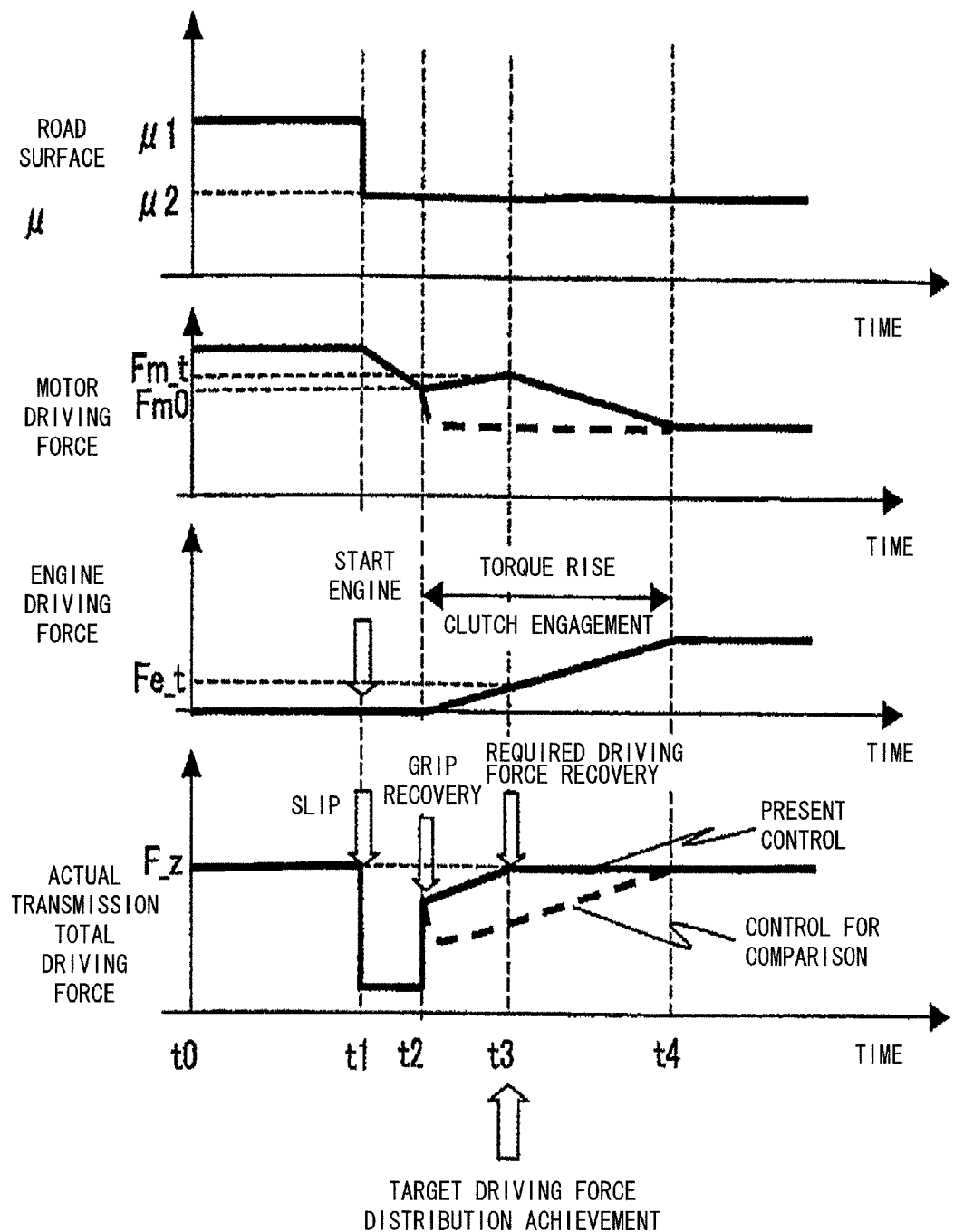
FIG. 4 is a diagram showing change in driving force (in the case where driving force before slipping can be recovered) in the first embodiment.
Figure 5:
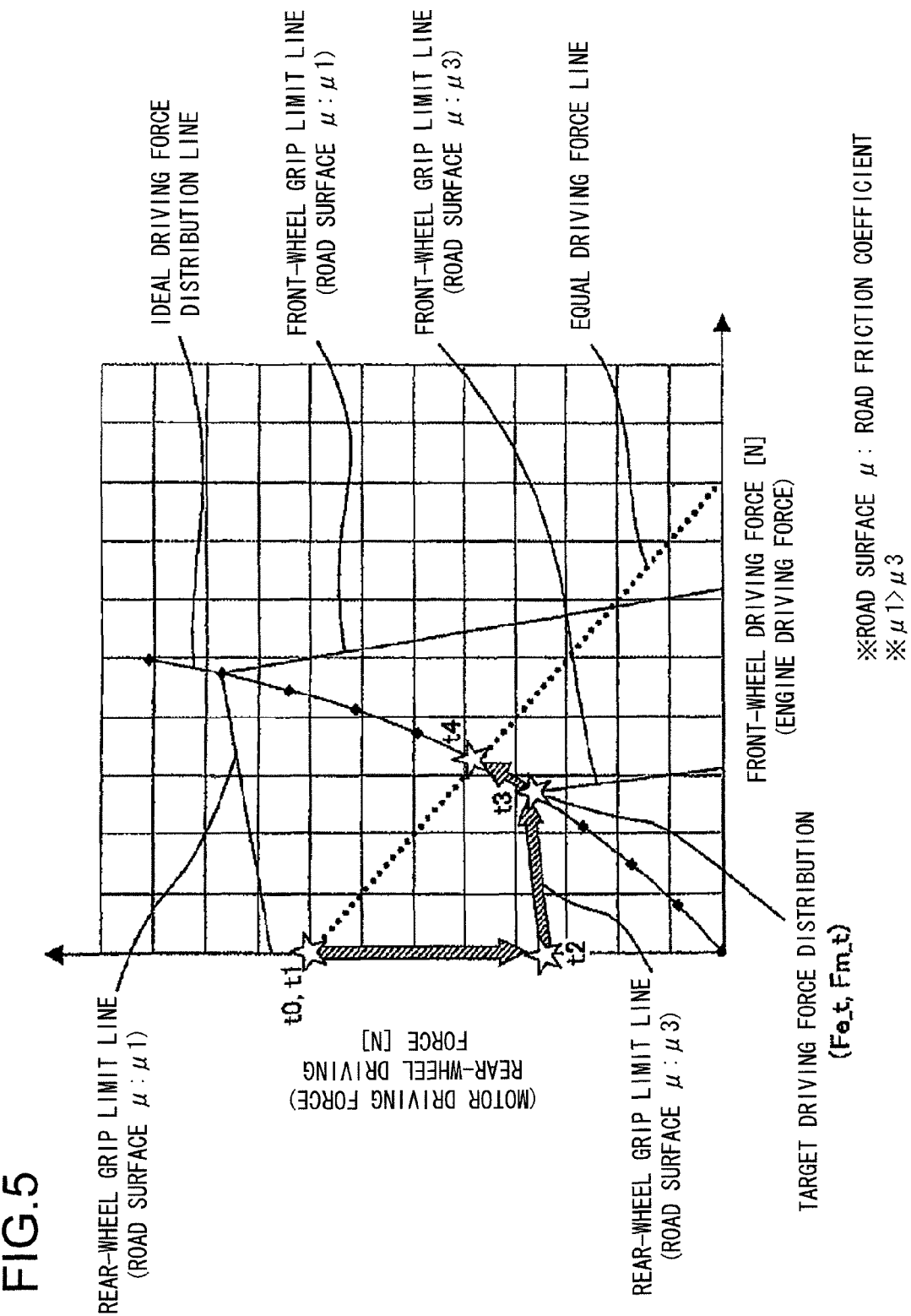
FIG. 5 is a driving force distribution diagram (in a case where driving force before slipping can not be recovered) showing the driving force distribution control process in the first embodiment.
Figure 6:
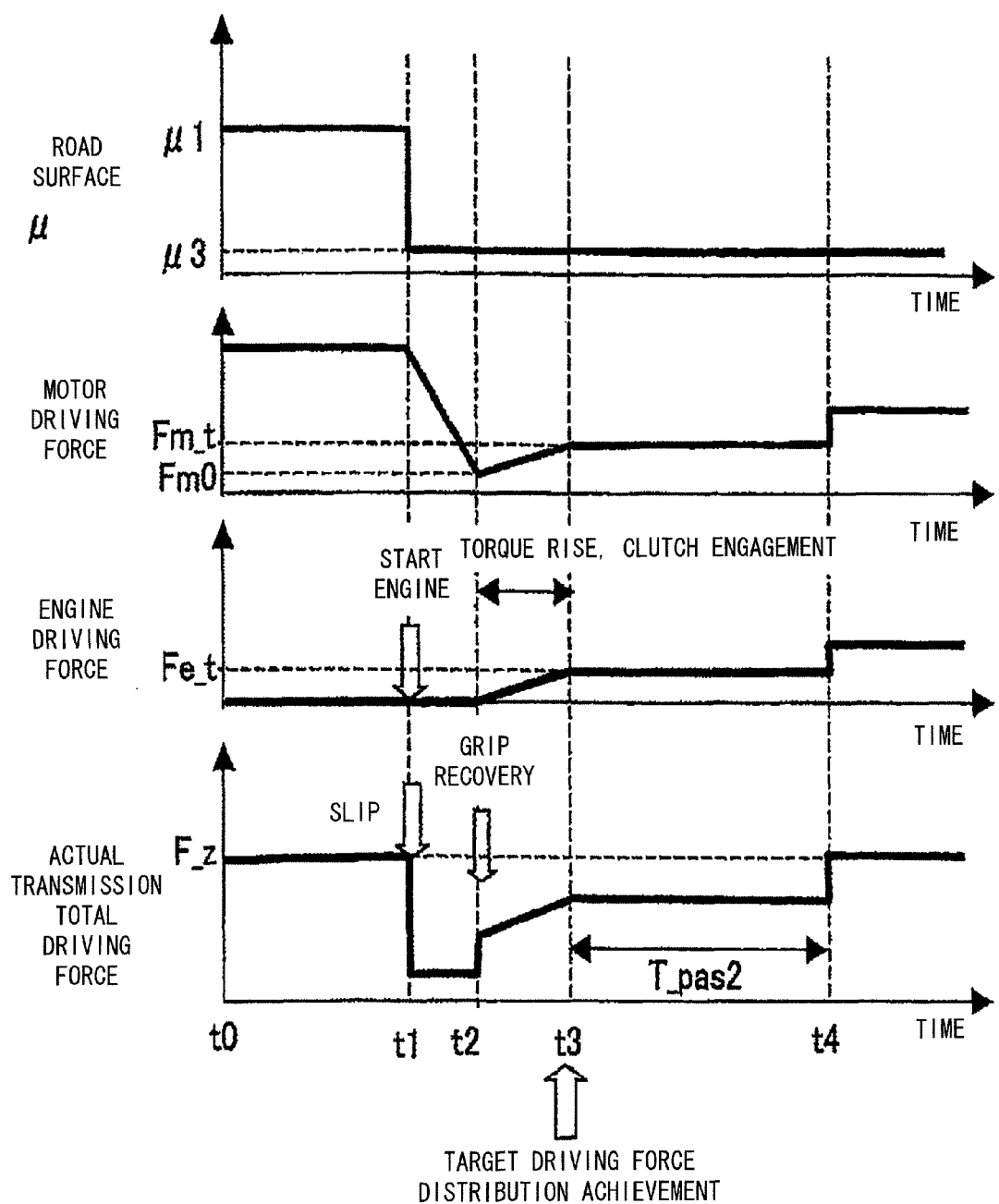
FIG. 6 is a diagram showing change in driving force (in the case where driving force before slipping can not be recovered) in the first embodiment.

In FIG. 3 to FIG. 6, t0 is a point that represents EV travel prior to slip. Since drive by the engine is not performed during EV travel, t0 is positioned on the vertical axis on the driving force distribution diagram (FIG. 3 and FIG. 5). Let the road friction coefficient prior to slip be μ1.

The point t1 represents a state in which the road friction coefficient is reduced and slip occurs. In FIG. 3 and FIG. 5, t1 has fallen into the region of rear-wheel slip due to the change of the position of the rear-wheel grip limit line to the low μ road side (μ2 and μ3, respectively). FIG. 4 and FIG. 6 indicate that the actual transmission total driving force has dropped because grip of the rear wheels is lost at t1. In step 203 of FIG. 2, the total driving force, i.e., the motor driving force, immediately prior to the slip is saved as F_z.

Figure 7:
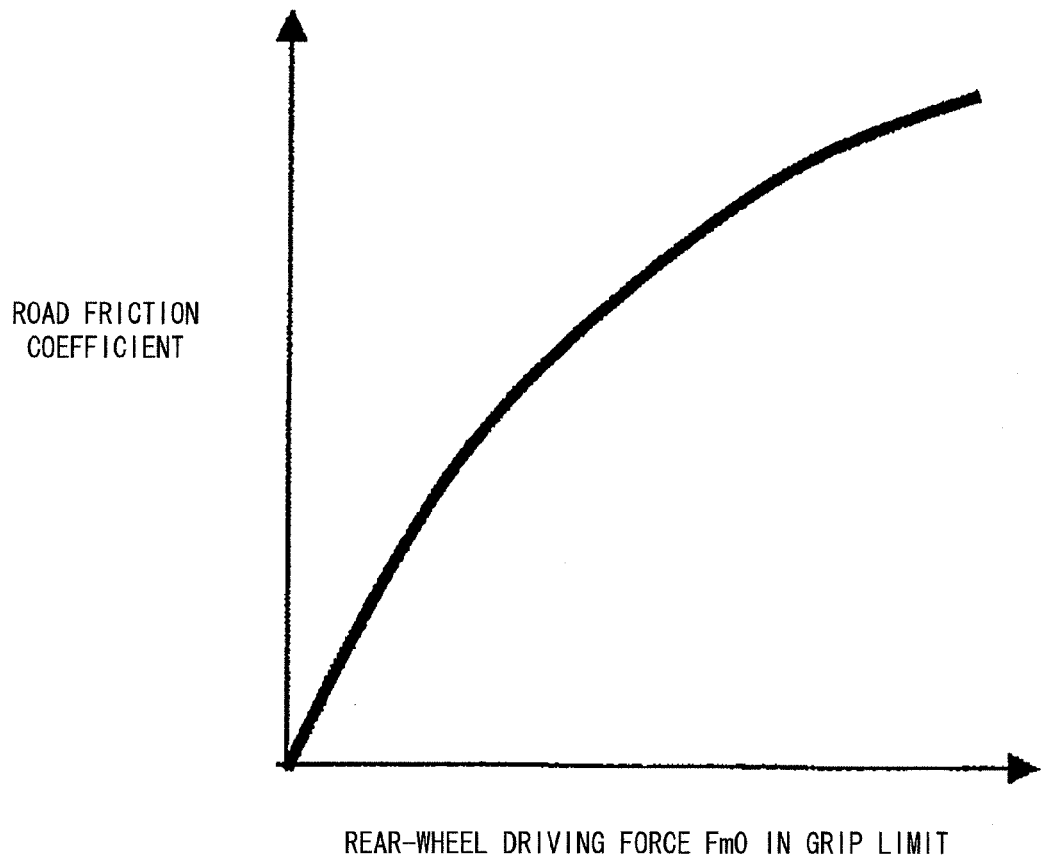
FIG. 7 is a diagram showing a relationship between rear-wheel driving force in grip limit and a road friction coefficient.

The point t2 represents a point at which grip of the rear wheels has been regained by gradually reducing the motor driving force (step 204). The motor driving force at t2 is saved as Fm0 and estimation of the road friction coefficient is performed (step 207). The road friction coefficient is estimated using a pre-prepared table (differs depending upon the type of vehicle) that represents the relationship between the grip limit rear-wheel driving force and the road friction coefficient (refer to FIG. 7).

In the F_z recovery possible/impossible determination of step 208, a decision is made as to whether or not there is a possibility to recover the driving force F_z prior to slip by the front and rear wheel driving force distribution in a range where no slip occurs on the road with the road friction coefficient estimated in step 207. The F_z recovery possible/impossible determination is carried out by determining whether or not the stable driving force distribution region bounded by the rear-wheel grip limit line (μ2 or μ3) and both of the vertical and horizontal axes intersect with the equal driving force line that represents F_z on the driving force distribution diagram (refer to FIG. 3 and FIG. 5). Since the grip limit lines of the front and rear wheels are uniquely determined by the road friction coefficient, a decision can be made by a geometric calculation as to whether or not an intersection occurs between the stable driving force distribution region and the equal driving force line. If the stable driving force distribution region and the equal driving force line do not intersect (refer to FIG. 5), the driving force F_z prior to slip can not be recovered even if the driving force distribution is changed in a stable range from t2.

In step 209, the target driving force distribution (Fe_t, Fm_t) is set based upon the F_z recovery possible/impossible determination result in step 208. A distribution represented by t3 on the driving force distribution diagram (FIG. 3 and FIG. 5) may be taken as an example of the target driving force distribution (Fe_t, Fm_t). In other words, if the F_z recovery is possible (FIG. 3), the distribution is set to be that represented by the intersection point between the rear-wheel grip limit line (μ2) and the equal driving force line, and, if the F_z recovery is impossible (FIG. 5), the distribution is set to that represented by the intersection point between the rear-wheel grip limit line (μ3) and the ideal driving force distribution line. Specific values of the engine driving force and the motor driving force at the target driving force distribution are obtained by a geometric calculation.

In steps 210 and 211, transmission of the engine driving force and control of the motor driving force are performed so as to achieve the target driving force distribution (Fe_t, Fm_t). During delay until the engine driving force Fe(t) reaches Fe_t, the motor driving force is controlled in accordance with $$Fm(t)=f(Fm0,Fe(t),\mu) \quad (4)$$

(step 211), which is the process from t2 to t3 in FIG. 3, FIG. 4, FIG. 5, and FIG. 6. This is a control to increase the motor driving force so as to trace on the rear-wheel grip limit line with an increase in the engine driving force on the driving force distribution diagram (FIG. 3 and FIG. 5), and the right hand side of the expression (4) can be written as follows.

$$f(Fm0,Fe(t),\mu)=Fm0+Fe(t)\times\tan(\theta(\mu)) \quad (5)$$

Figure 8:
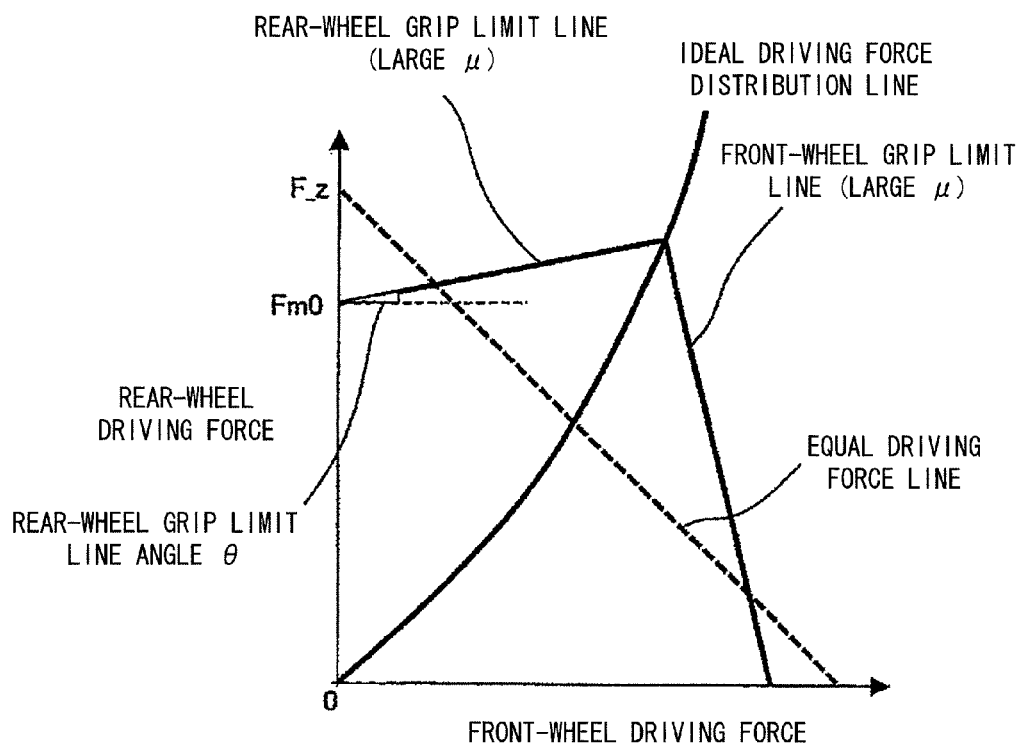
FIG. 8 is an explanatory diagram of a rear-wheel grip limit line angle on a driving force distribution diagram.
Figure 9:
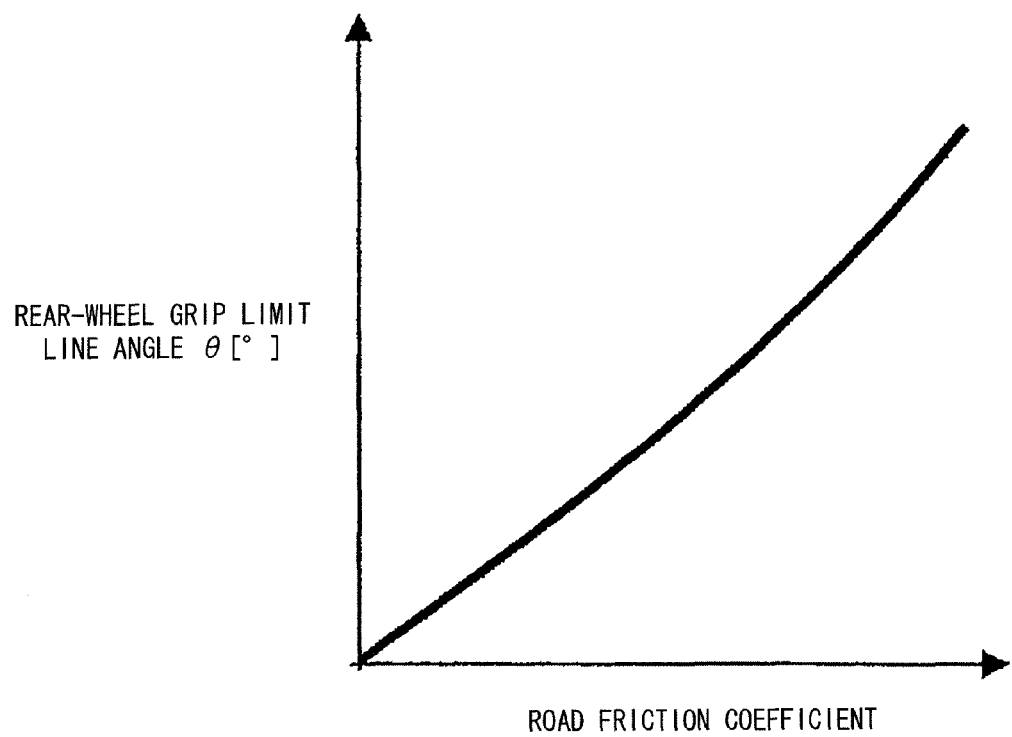
FIG. 9 is a diagram showing a relationship between the road friction coefficient and a rear-wheel grip limit line angle.

The θ(μ) in the second term of the right hand side of the expression (5) is an angle formed by the rear-wheel grip limit line in a certain road friction coefficient and the horizontal axis (refer to FIG. 8) and is a variable that is uniquely determined by various constants of the vehicle and the road friction coefficient (refer to FIG. 9).

According to step 211, control of the motor driving force is performed to an extent corresponding to the engine driving force so that the driving force distribution (Fe, Fm) of the engine and the motor reaches the target driving force distribution (Fe_t, Fm_t) that is represented by t3 (step 212). At the time point of t3, the driving force F_z prior to slip is stably recovered (FIG. 3 and FIG. 4) or, even if F_z can not be recovered, the maximum driving force that enables stable travel is regained (FIG. 5 and FIG. 6).

Figure 10:
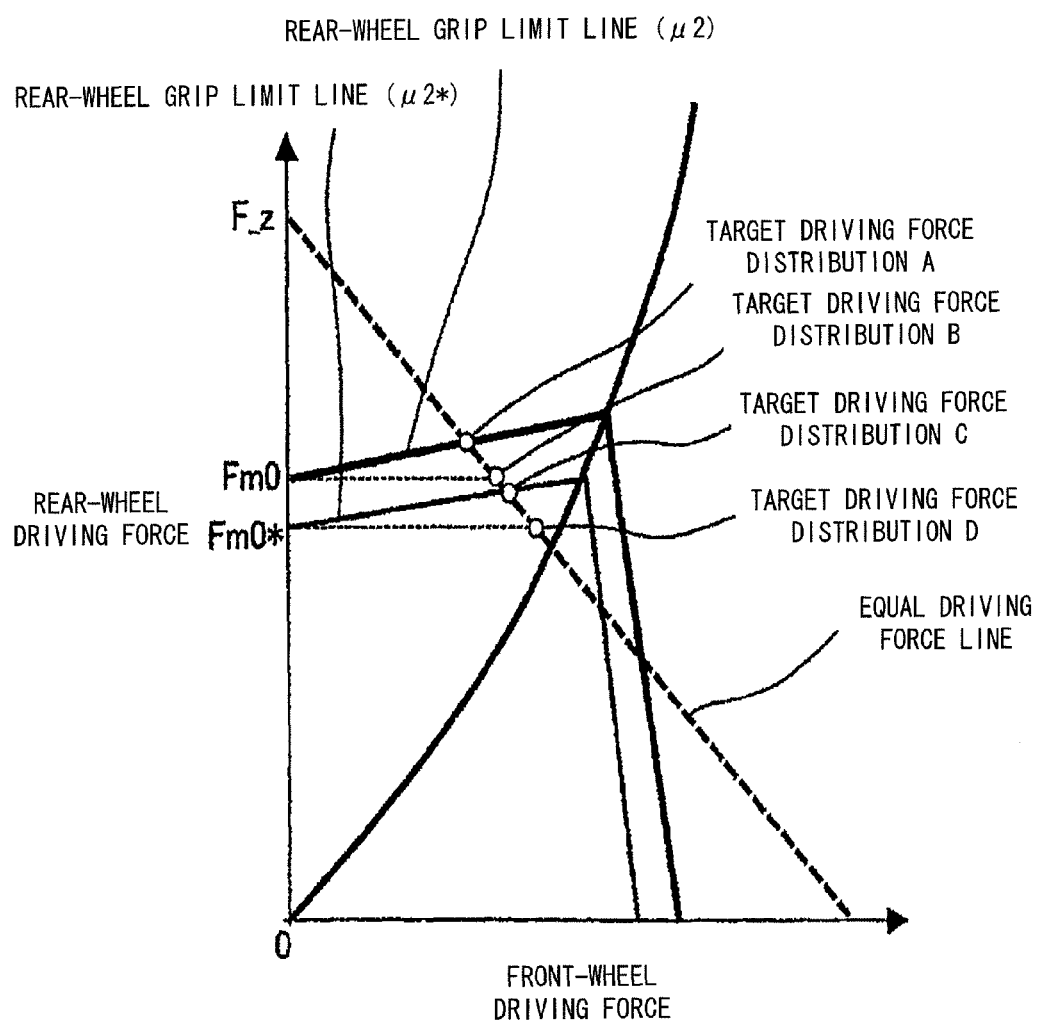
FIG. 10 is a diagram showing a plurality of target driving force distribution setting methods.

Here, regarding a setting method of the target driving force distribution in step 209, a method other than the setting method described above will be described. Although a case in which F_z recovery is possible will only be described (the road friction coefficient μ2), the same is true for a case in which F_z recovery is impossible. FIG. 10 shows four types of target driving force distributions. A target driving force distribution A is the distribution described above, which is a distribution expressed by the intersection point between the rear-wheel grip limit line (μ2) and the equal driving force line. A target driving force distribution B is a distribution expressed by the intersection point between a straight line that passes through (0, Fm0) and in parallel with the horizontal axis and the equal driving force distribution line. A target driving force distribution C is a distribution expressed by the intersection point between the rear-wheel grip limit line (μ2*) and the equal driving force line. Here, μ2* is set smaller than the road friction coefficient μ2 estimated in step 207. The difference between μ2 and μ2* may be a predetermined value or determined in accordance with slipperiness of the road estimated from a past slippage history or the like. Let the motor driving force at the intersection point between the rear-wheel grip limit line (μ2*) and the vertical axis be Fm0*. A target driving force distribution D is a distribution expressed by the intersection point between a straight line that passes through (0, Fm0*) and in parallel with the horizontal axis and the equal driving force distribution line.

Depending upon the difference between the target driving force distributions, the right hand side of the calculation method (4) for Fm in step 211 is different as follows.

Where the target driving force distribution B is set, $$f(Fm0,Fe(t),\mu)=Fm0 \quad (6)$$

Where the target driving force distribution C is set, $$f(Fm0,Fe(t),\mu)=Fm0*+Fe(t)\times\tan(\theta(\mu2*)) \quad (7)$$

Where the target driving force distribution D is set, $$f(Fm0,Fe(t),\mu)=Fm0* \quad (8)$$

Here, although the path to the target driving force distribution A is a driving force distribution that makes the best use of the road friction and can keep the vehicle driving force the highest, a slight change in the road friction coefficient may cause rear-wheel slip again. On the other hand, the paths to the target driving force distributions B, C, and D are slightly low in the vehicle driving force but advantageous in stability of the vehicle in comparison with the target driving force distribution A because a margin is taken from the rear-wheel grip limit line (μ2) when the driving force distribution is carried out.

As another method to determine the target driving force distribution, it is obviously possible to select an arbitrary distribution in between the target driving force distributions A to D. In addition, while, as the right hand side of the expression (4), the functions are set to draw a straight line on the driving force distribution diagram as expressed by the expressions (6) to (8), paths that the functions take are not necessarily straight lines and, as long as in the range not beyond the rear-wheel grip limit line in the estimated the road friction coefficient μ2, any path can be chosen.

Figure 11:
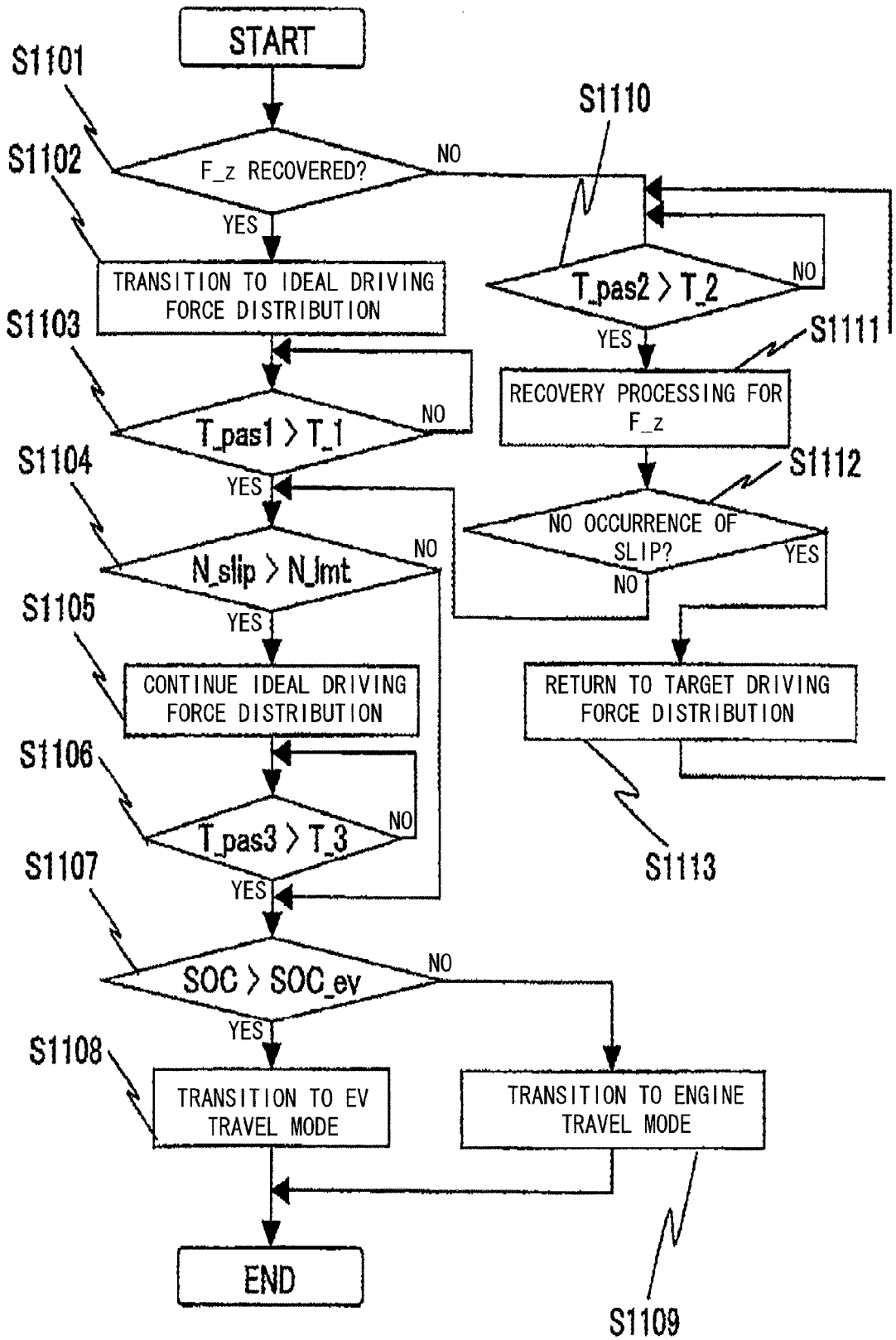
FIG. 11 is a chart showing the contents of the transition control after driving force recovery in the first embodiment.

The transition control after driving force recovery in step 213 will be explained with reference to FIG. 11. It is to be noted that the following explanation is based upon the assumption that the target driving force distribution was set to the target driving force distribution A (FIG. 10) in step 209.

In step 1101, a decision is made as to whether or not the current driving force has recovered the driving force F_z prior to slip. The F_z recovery possible/impossible determination result in step 208 is referred here. If F_z has been recovered (FIG. 3 and FIG. 4), the driving force distribution is adjusted to be the front and rear ideal driving force distribution without changing the total driving force in step 1102. More specifically, on the driving force distribution diagram, the driving force distribution is shifted onto the ideal driving force distribution line as it traces on the equal driving force line (transition from t3 to t4 in FIG. 3). The ideal driving force distribution is a front and rear distribution that can make the best use of the frictional force of the front and rear wheels as described earlier.

If F_z has not been recovered in step 1101 (FIG. 5 and FIG. 6), considering that the current road friction coefficient is small and the road is slippery, the target driving force distribution state continues until an elapsed time T_pas2 becomes a predetermined time T_2 (step 1110). After that, in step 1111, the driving force F_z is recovered by increasing the driving force while keeping the ideal driving force distribution (transition from t3 to t4 in FIG. 5). If slip occurs in the process of increasing the driving force (step 1112), the driving force distribution is returned to the target driving force distribution (step 1113) and count of the elapsed time in step 1110 is carried out again.

If an elapsed time T_pas1 in the ideal driving force distribution exceeds a predetermined time T_1 (for example, five seconds) in step 1103, or, if the driving force can be recovered to F_z without occurrence of slip in step 1112, the number of slips N_slip in a past predetermined time (for instance, one minute) is referred and, if it exceeds a predetermined number of slips N_lmt (for example, three slips), a decision is made that the slippery road remains (step 1104) and the ideal driving force distribution continues (step 1105). Then, if an elapsed time T_pas3 in step 1105 exceeds a predetermined time T_3 (for instance, five seconds) (step 1106), the travel method transitions to the two-wheel drive travel that is advantageous in efficiency.

In addition, if N_slip≦N_lmt in step 1104, a decision is made that the road is not slippery and the travel method transitions to the two-wheel drive travel. In transitioning to the two-wheel drive travel, a decision is made in step 1107 as to whether or not the state of charge SOC of the battery 110 remains more than a predetermined battery state of charge SOC_ev that enables EV travel (for instance, 50%). If SOC>SOC_ev, the travel mode transitions to EV travel mode and, if not, transitions to engine travel mode (step 1109).

If after transitioning to the EV travel mode, slip occurs again in the drive wheel, the control of FIG. 2 is executed again. As for drive wheel slip in the engine travel mode, motor driven driving force recovery is performed rapidly. In addition, if front and rear wheels simultaneously slip occurs because, for instance, the road friction coefficient is reduced when the driving force distribution is controlled on the ideal driving force distribution line as in steps 1102, 1105, and 1111, a control to reduce the vehicle driving force as it traces on the ideal driving force distribution line is desirable.

It is to be noted that the control presented above premises that the driving force required by the driver is constant, i.e., the accelerator position is not changed, and, if after occurrence of slip, there is any change in the driving force required by the driver, the present control is stopped and priority is given to the newly required driving force.

An example of the effect of the driving force recovery control according to the present embodiment will be given now. For comparison, a case is assumed in which the driving force distribution at the ideal driving force distribution point (t4 in FIG. 3) is required simultaneously to the engine and the motor after the grip recovery by reducing the motor driving force (t2 in FIG. 3). As described earlier, while the motor has an excellent responsiveness to the required driving force, the engine has a poor responsiveness compared to that of the motor, with their responsivenesses differing by one order of magnitude. Due to this, in the control for comparison, as indicated by the dashed line arrow of FIG. 3, the rear-wheel driving force by the motor decreases rapidly and then the front-wheel driving force by the engine increases. Comparison of changes in the driving forces along the time axis with reference to FIG. 4 indicates that while the actual transmission total driving force (dashed line) of the control for comparison drops immediately after t2 and the vehicle driving force recovery is delayed, the present control (solid line) enables vehicle driving force recovery more rapidly.

According to the approximate result of the effect, the present control enables the vehicle driving force F_z prior to slip to be recovered more rapidly by 0.6 seconds than the control for comparison does. In addition, while the vehicle driving force ratios ((Fe+Fm)/F_z) in the process to the vehicle driving force recovery are 54% (t2) to 73% (t3) to 100% (t4) in the control for comparison, those are 80% (t2) to 100% (t3) to 100% (t4) in the present control, which indicates that compared to the control for comparison, the present control can maintain high vehicle driving force and recover the vehicle driving force prior to slip. It is to be noted that the calculation was carried out with the following conditions:

Vehicle Weight: Approximately 1800 kg
Speed: 30 km/h
Vehicle Acceleration: 0.1 G (1 G=9.81 m/s$^2$)
Slope Gradient: 6.3%
Road Friction Coefficient: Change from 0.4 to 0.3 (from wet asphalt road to snow road)
t2 to t4: 1 sec As explained above, in the first embodiment, the driving control device of a four-wheel drive hybrid vehicle in which either of the front wheels or the rear wheels are driven by the engine and the other wheels are driven by the motor, upon slipping of the motor drive wheel, causes the grip of the wheel to recover by reducing the driving force by the motor and simultaneously estimates the road friction coefficient, and in accordance with the engine driving force transmitted to the drive wheels and the estimated road friction coefficient, increases or maintains the driving force by the motor. This allows the vehicle driving force to be recovered rapidly.

Second Embodiment

Next, the driving control device of a four-wheel drive hybrid vehicle of the present embodiment will be explained with a different vehicle structure.

Figure 12:
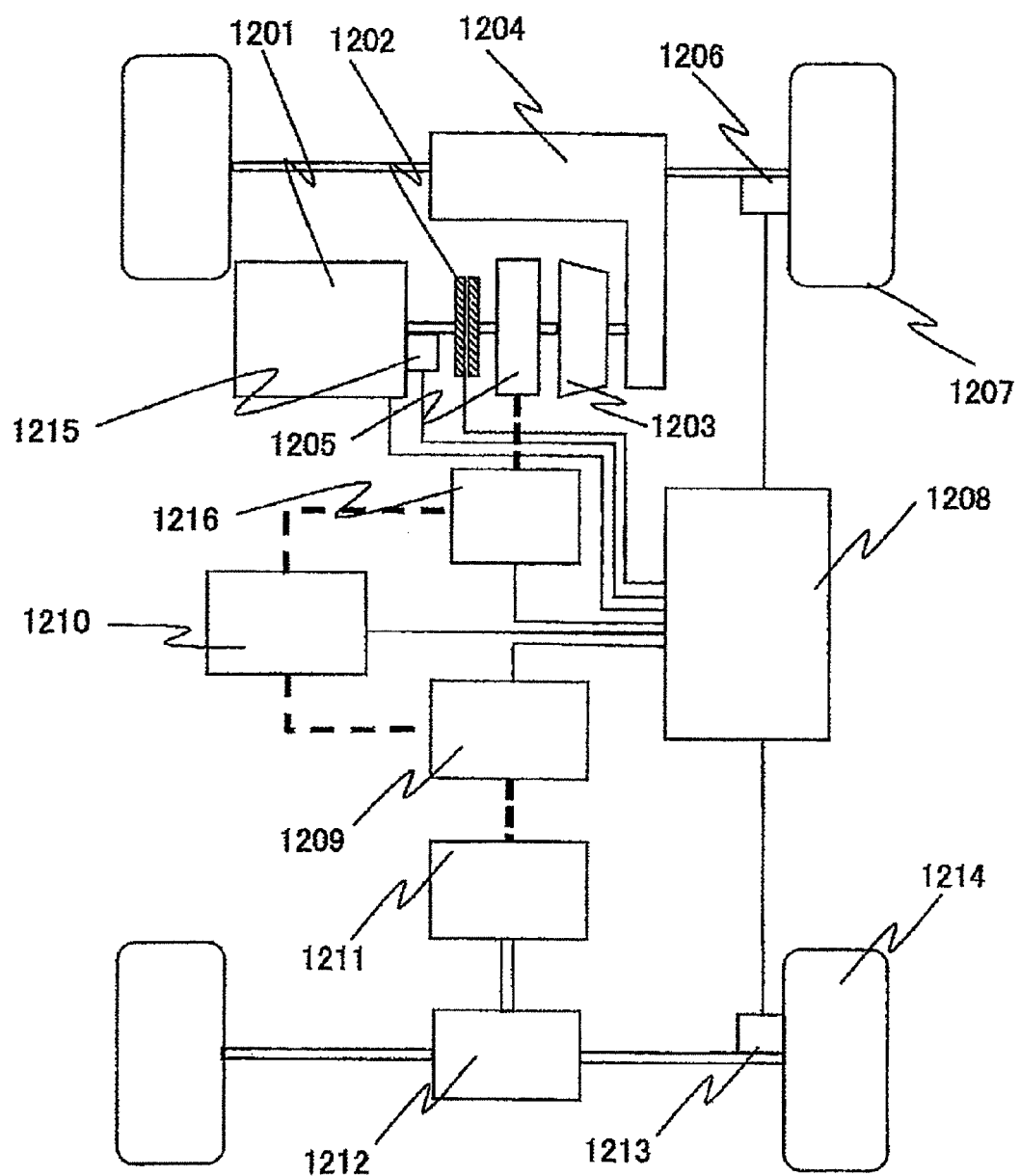
FIG. 12 is a hardware structure diagram of the hybrid vehicle driving control device in a second embodiment.

The vehicle structure will be explained with reference to FIG. 12. The present vehicle includes an engine 1201 at the front and a front motor 1205 and a rear motor 1211 at the front and rear, respectively, as driving force sources. The engine 1201 and the front motor 1205 can be engaged and released by a clutch 1202, and the driving force of the front wheels 1207 can be switched between only by the front motor 1205 and by the engine 1201 and the front motor 1205. The front motor 1205 is driven by electric power of a battery 1210 controlled by a front inverter 1216. The driving force only by the front motor 1205 or by the engine 1201 and the front motor 1205 is transmitted to the front wheels 1207 through a transmission 1203 and a front differential gear 1204. The rear motor 1211 is driven by electric power of the battery 1210 controlled by a rear inverter 1209 and torque is transmitted to rear wheels 1214 through a rear differential gear 1212. An ECU 1208 can obtain the engine speed and the engine estimated torque from an engine state detection device 1215, the battery state of charge SOC from the battery 1210, and the wheel speed of each of the front and rear wheels from a front-wheel rotational speed detection means 1206 and a rear-wheel rotational speed detection means 1213, and, based upon those information, determines the engine output and the output of each of the motors and sends instructions to the engine 1201, the clutch 1202, the front inverter 1216, and the rear inverter 1209.

More specifically, the ECU 1208 includes a first driving force detection circuit unit that detects reduction in vehicle driving force caused by a change in the road friction coefficient in a state where driving force by the engine 1201 is untransmitted, a four-wheel motor travel possible/impossible determination circuit unit that makes a decision as to whether or not four-wheel motor travel by the engine-side motor 1205 and the motor 1211 is possible, and a slip control mode switching circuit unit that switches between a slip control mode using the engine and a slip control mode without using the engine depending upon the determination result of the four-wheel motor travel possible/impossible determination circuit unit.

In addition, the ECU 1208 includes a first motor control circuit unit that controls driving force by the motor to be reduced in accordance with a detection result of the first driving force detection circuit unit, a second driving force detection circuit unit that detects vehicle driving force recovery caused by reduction in motor driving force by the first motor control circuit unit, a friction coefficient estimation circuit unit that estimates the road friction coefficient based upon a detection result of the second driving force detection circuit unit, a target driving force distribution setting circuit unit that sets a target driving force distribution based upon the detection result of the second driving force detection circuit unit and an estimation result of the friction coefficient estimation circuit unit, an engine control circuit unit that controls transmission driving force by the engine 1201 to be increased in accordance with the detection result of the second driving force detection circuit unit, a second motor control circuit unit that controls driving force of the motor 1211 that has been reduced by the first motor control circuit unit to be increased in accordance with rise of transmission driving force by the engine 1201, and a third motor control circuit unit that controls driving force of the engine-side motor 1205 and the motor 1211 so as to satisfy the driving force before reduction in the driving force has been detected by the first driving force detection circuit unit and to realize a predetermined ideal front and rear distribution in accordance with the detection result of the second driving force detection circuit unit and the estimation result of the friction coefficient estimation circuit unit.

Figure 13:
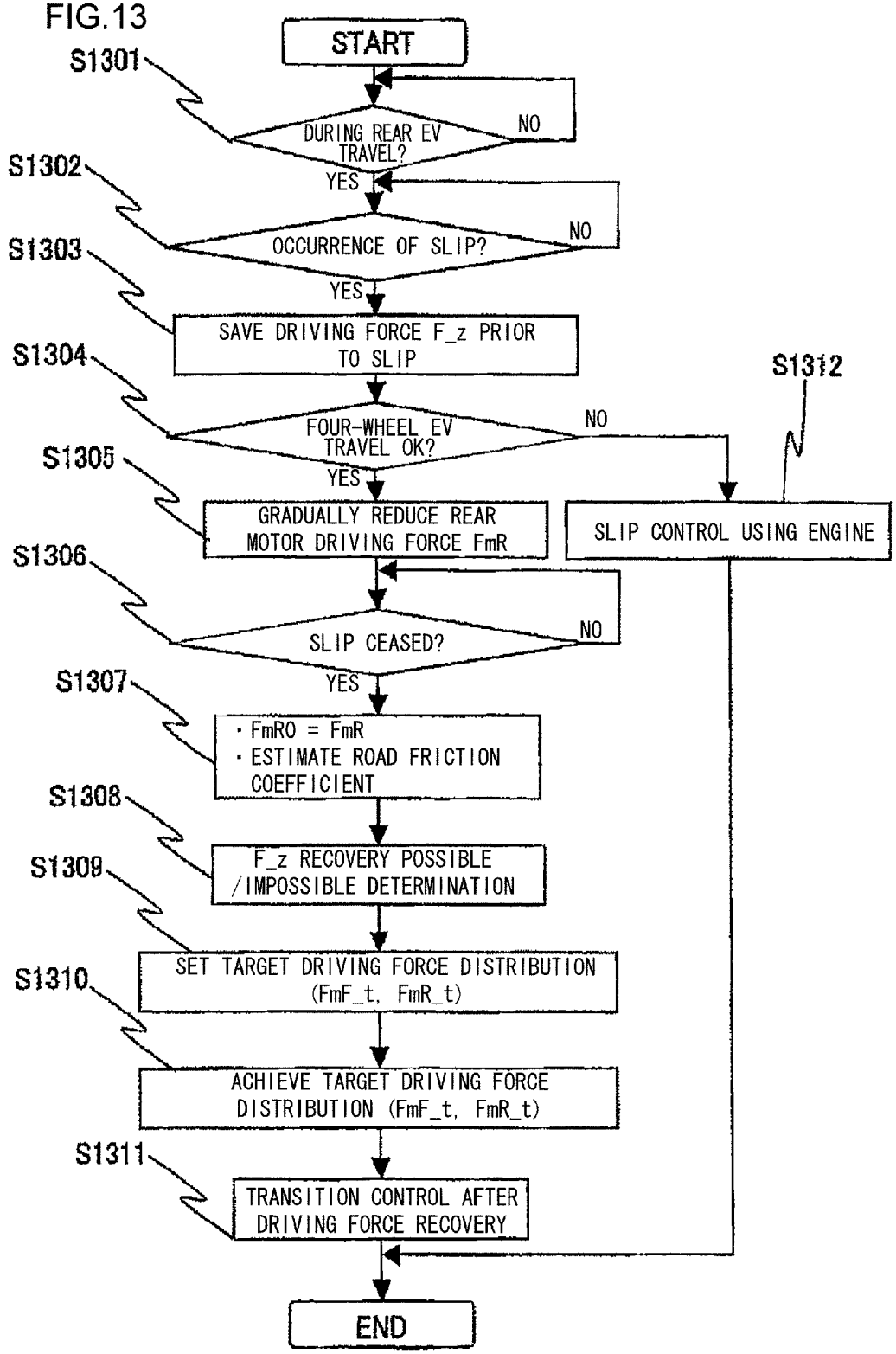
FIG. 13 is a flow chart of the overall control in the second embodiment.

The whole picture of control of the present embodiment will be explained with reference to FIG. 13. FIG. 13 is a flow chart showing the processing procedure of driving force recovery control processing executed at the ECU 1208.

In step 1301, a decision is made as to whether or not the present hybrid vehicle is performing two-wheel drive travel by the rear motor (hereinafter referred to as "rear EV travel"). During the rear EV travel, if occurrence of slip in the rear motor drive wheel is detected in step 1302, the flow of control proceeds to step 1303. Here, in the detection of occurrence of slip in step 1302, a decision is made that slip of the rear wheel 1214 is occurring if a decision is made that the wheel speed of the rear wheels 1214 is greater than the wheel speed of the front wheels 1207 by a difference equal to or greater than a certain threshold value in the wheel speeds of the front and rear wheels detected by the front-wheel rotational speed detection means 1206 and the rear-wheel rotational speed detection means 1213.

In step 1303, the vehicle driving force immediately prior to slip detection is saved in a memory in the ECU 1208 as F_z. F_z is calculated from a rear motor current amount ImR_z and a rear motor rotation speed NmR_z immediately prior to slip detection, the reduction ratio FinalGearRear in the rear differential gear 1212, and the tire radius Rtire. More specifically, a rear motor torque TmR_z is obtained by the expression (9) and F_z is calculated by multiplying the motor torque TmR_z by the reduction ratio and the tire radius as in the expression (10). The function f(ImR_z, NmR_z) of the expression (10) can be not only obtained by calculating a theoretical expression but also substituted by using a two-dimensional map prepared on the memory where the current ImR_z and the rotational speed NmR_z are used as input and the torque ImR_z is used as output.

$$TmR\_z = f(ImR\_z, NmR\_z) \quad (9)$$

$$F\_z = TmR\_z \times \text{FinalGearRear} \times \text{Rtire} \quad (10)$$

Figure 14:
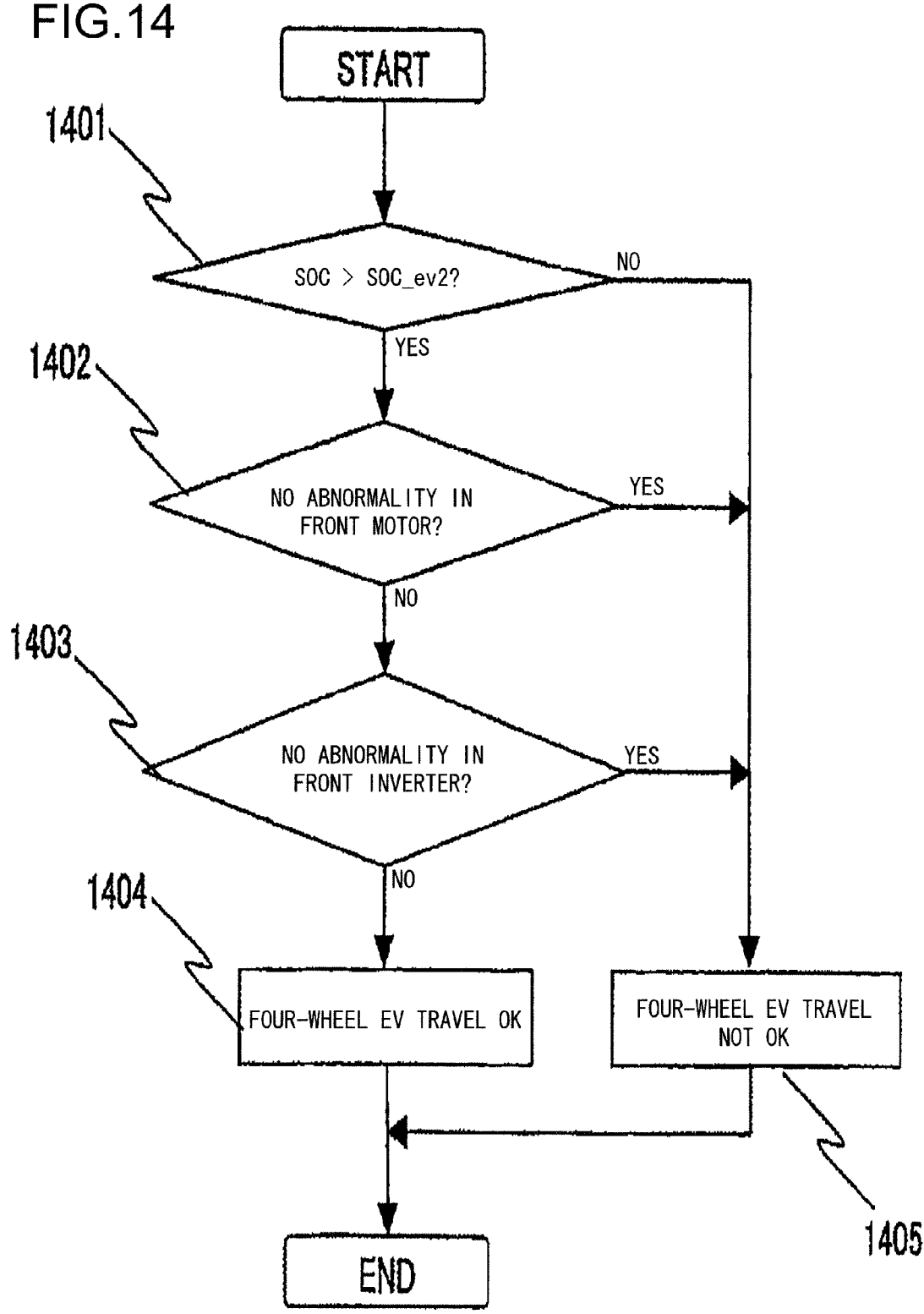
FIG. 14 is a chart showing the four-wheel EV travel possible/impossible determination method in the second embodiment.

In the subsequent step 1304, four-wheel EV travel possible/impossible determination is carried out. In four-wheel EV travel, in a state where the clutch 1202 is released, the vehicle travels using the front motor 1205 and the rear the motor 1211 as driving force sources. The four-wheel EV travel possible/impossible determination is carried out as in FIG. 14. That is, if the battery state of charge SOC sufficient to drive the front and rear wheels by the motor is left in the battery 1210 (step 1401) and there is no abnormality in the front motor 1205 and the front inverter 1216 (step 1402 and step 1403), four-wheel EV travel is permitted (step 1404). If any of the conditions of steps 1401 to 1403 is not satisfied, four-wheel EV travel is not permitted (step 1405).

In the four-wheel EV travel possible/impossible determination, if a decision is made that the four-wheel EV travel is not possible, slip control using the engine is carried out in step 1312. Since the slip control using the engine is the same as the control described in the first embodiment, its description will be curtailed.

In the four-wheel EV travel possible/impossible determination, if a decision is made that the four-wheel EV travel is possible, a driving force FmR of the rear motor 1211 is gradually reduced at a predetermined rate so as to recover the grip of the rear wheels (step 1305). The reduction in motor driving force in step 1305 continues until the slip of the rear wheels ceases (step 1306). A decision is made that the rear-wheel slip has ceased if the wheel speed difference in the front and rear wheels detected by the front-wheel rotational speed detection means 1206 and the rear-wheel rotational speed detection means 1213 becomes equal to or less than a predetermined value. Upon making a decision in step 1306 that the slip of the rear wheels 1214 has ceased, in step 1307, the rear motor driving force when the slip ceased is saved as FmR0 into the memory in the ECU 1208. Here, the rear motor driving force FmR0 is a value obtained by converting torque of the rear motor 1211 into vehicle driving force similarly to the expression (10). In addition, in step 1307, estimation of the road friction coefficient is performed. Estimation of the road friction coefficient is as described in step 207 of FIG. 2 in the first embodiment.

In step 1308, on an assumption of the road friction coefficient estimated in step 1307, a decision is made as to whether or not the driving force F_z prior to slip can be recovered by the driving force distribution in a range where no slip occurs. The F_z recovery possible/impossible determination method is the same as the method described in the first embodiment.

In step 1309, a target driving force distribution (FmF_t, FmR_t) is set based upon the determination result in step 1308. Here, FmF_t is the driving force by the front motor 1205 and FmR_t is the driving force by the rear the motor 1211. The setting method for the target driving force distribution is the same as that of the first embodiment.

Figure 15:
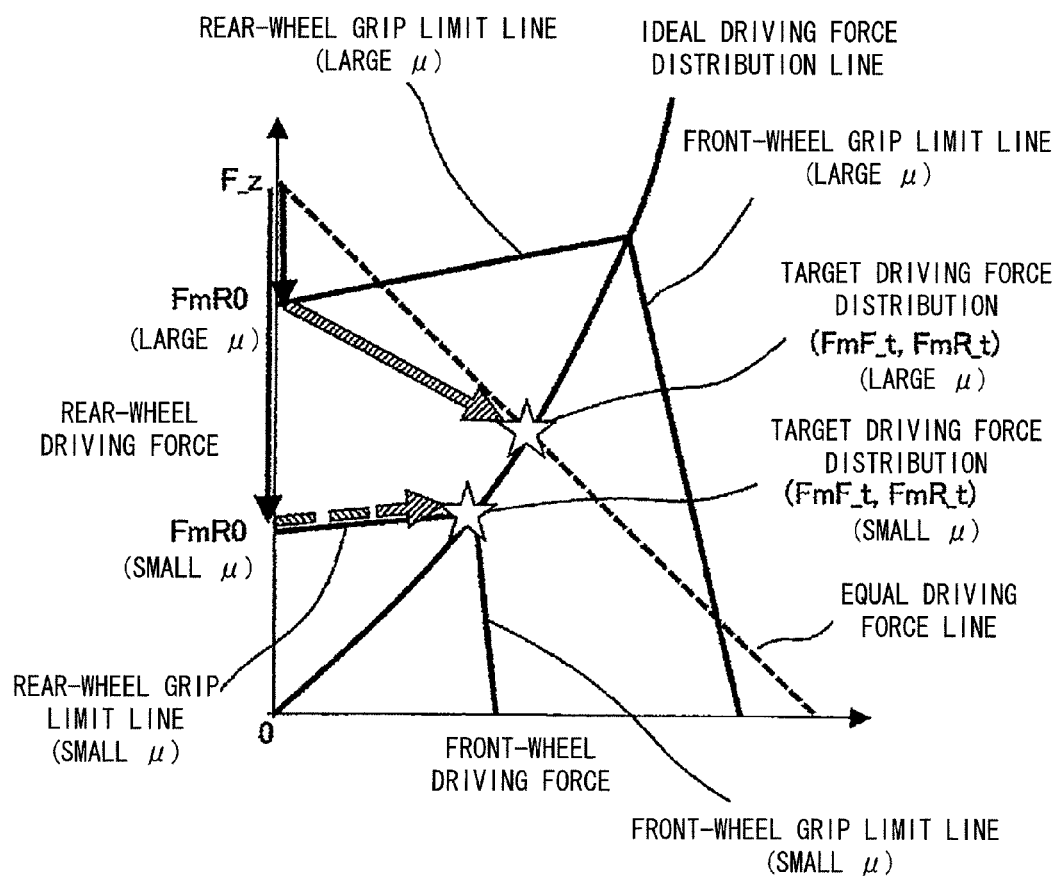
FIG. 15 is a driving force distribution diagram showing the driving force distribution control process in the second embodiment.

In the subsequent step 1310, the target driving force distribution set in step 1309 is achieved. The achievement of the target driving force distribution, i.e., transition from (0, FmR0) to (FmF_t, FmR_t) is performed as indicated by the hatched arrow (where F_z recovery is possible) or the hatched, dashed line arrow (where F_z recovery is impossible) in FIG. 15. Unlike the first embodiment, since both of the front and rear wheels are driven by the motors of an excellent responsiveness, a transition control in view of delay in response is not necessarily performed.

It is not until the target driving force distribution is achieved that while slip is prevented, the vehicle driving force prior to slip is recovered or the maximum vehicle driving force that enables stable traveling is regained. After that, an appropriate transition control after driving force recovery is performed in accordance with a road condition and a vehicle condition (step 1311). The transition control after driving force recovery is the same as in step 213 of the first embodiment (the detailed contents are stated in FIG. 11). However, since in the vehicle structure of the present embodiment, two types of drive methods, i.e., the front motor drive method and the rear motor drive method, are available as the EV travel mode in step 1108, any one of them is to be selected.

The above is the explanation of the second embodiment. According to the above structure, the vehicle driving force recovery when the motor drive wheel slips can be performed more rapidly.

Although a variety of embodiments are described above, the present invention is not to be limited only to those contents. The scope of the present invention includes other possible embodiments invented within the scope of the technical idea of the present invention.

The disclosure of the following priority application is herein incorporated by reference: Japanese Patent Application No. 2009-212627 (filed on Sep. 15, 2009)

The invention claimed is:

1. A driving control device for a vehicle in which one of a front-wheel side and a rear-wheel side is driven by an engine and an other of them is driven by a motor, the driving control device comprising:
    a first driving force detection circuit unit that detects reduction of vehicle driving force due to a change of road friction coefficient in a state where driving force by the engine is not transmitted;
    a first motor control circuit unit that reduces driving force by the motor in response to a detection result of the first driving force detection circuit unit;
    a second driving force detection circuit unit that detects whether or not the vehicle driving force is recovered due to reduction of motor driving force by the first motor control circuit unit and detects a magnitude of the motor driving force;
    a friction coefficient estimation circuit unit that estimates a road friction coefficient based upon a detection result of the second driving force detection circuit unit;
    a target driving force distribution setting circuit unit that sets a target driving force distribution based upon a detection result of the second driving force detection circuit unit and an estimation result of the friction coefficient estimation circuit unit;
    an engine control circuit unit that increases transmitted driving force by the engine in response to a detection result of the second driving force detection circuit unit; and
    a second motor control circuit unit that increases the motor driving force that has been reduced by the first motor control circuit unit in accordance with increase of transmitted driving force by the engine.

2. A driving control device according to claim 1, wherein:
the friction coefficient estimation circuit unit estimates the road friction coefficient based upon the motor driving force of a timing when recovery of the vehicle driving force is detected by the second driving force detection circuit unit.

3. A driving control device according to claim 1, wherein:
the target driving force distribution setting circuit unit sets the target driving force distribution based upon the motor driving force of a timing when recovery of the vehicle driving force is detected by the second driving force detection circuit unit, a rear-wheel grip limit in the road friction coefficient estimated by the friction coefficient estimation circuit unit, and a driving force before reduction of the driving force has been detected by the first driving force detection circuit unit.

4. A driving control device according to claim 1, wherein:
the target driving force distribution setting circuit unit sets the target driving force distribution based upon the motor driving force of a timing when recovery of the vehicle driving force is detected by the second driving force detection circuit unit, rear-wheel grip limit in a road friction coefficient that is smaller by a predetermined amount than the road friction coefficient estimated by the friction coefficient estimation circuit unit, and driving force before reduction in the driving force has been detected by the first driving force detection circuit unit.

5. A driving control device according to claim 1, wherein:
the second motor control circuit unit increases or maintains the motor driving force until sum of the driving force by the motor and the driving force by the engine reaches driving force before reduction in the driving force has been detected by the first driving force detection circuit unit, based upon an estimation result of the friction coefficient estimation circuit unit and a setting result of the target driving force distribution setting circuit unit.

* * * * *